United States Patent
Son et al.

(10) Patent No.: US 12,412,894 B2
(45) Date of Patent: Sep. 9, 2025

(54) METHOD OF PREPARING POSITIVE ELECTRODE ACTIVE MATERIAL

(71) Applicant: LG Chem, Ltd., Seoul (KR)

(72) Inventors: Min Hee Son, Daejeon (KR); Hyuck Lee, Daejeon (KR); Duck Gyun Mok, Daejeon (KR); No Woo Kwak, Daejeon (KR); Dong Joon Ahn, Daejeon (KR)

(73) Assignee: LG Chem, Ltd., Seoul (KR)

( * ) Notice: Subject to any disclaimer, the term of this patent is extended or adjusted under 35 U.S.C. 154(b) by 621 days.

(21) Appl. No.: 17/800,087

(22) PCT Filed: Apr. 15, 2021

(86) PCT No.: PCT/KR2021/004775
§ 371 (c)(1),
(2) Date: Aug. 16, 2022

(87) PCT Pub. No.: WO2021/210936
PCT Pub. Date: Oct. 21, 2021

(65) Prior Publication Data
US 2023/0098542 A1    Mar. 30, 2023

(30) Foreign Application Priority Data
Apr. 17, 2020    (KR) .................. 10-2020-0046965

(51) Int. Cl.
| | |
|---|---|
| *H01M 4/525* | (2010.01) |
| *C01G 53/50* | (2025.01) |
| *H01M 4/02* | (2006.01) |
| *H01M 4/36* | (2006.01) |
| *H01M 4/505* | (2010.01) |

(52) U.S. Cl.
CPC ............ *H01M 4/525* (2013.01); *C01G 53/50* (2013.01); *H01M 4/366* (2013.01); *H01M 4/505* (2013.01); *C01P 2002/50* (2013.01); *C01P 2004/80* (2013.01); *C01P 2006/40* (2013.01); *H01M 2004/028* (2013.01)

(58) Field of Classification Search
CPC .................................................... H01M 4/525
See application file for complete search history.

(56) References Cited

U.S. PATENT DOCUMENTS

| | | | |
|---|---|---|---|
| 2008/0318131 A1 | 12/2008 | Watanabe et al. | |
| 2016/0013476 A1 | 1/2016 | Oh et al. | |
| 2016/0043383 A1 | 2/2016 | Hamada et al. | |
| 2016/0118656 A1 | 4/2016 | Nakayama et al. | |
| 2018/0047977 A1 | 2/2018 | Furuichi et al. | |
| 2018/0323428 A1 | 11/2018 | Nakayama et al. | |
| 2018/0351169 A1 | 12/2018 | Oh et al. | |
| 2019/0123350 A1 | 4/2019 | Choi et al. | |
| 2019/0198872 A1 | 6/2019 | Saruwatari et al. | |
| 2020/0259161 A1 | 8/2020 | Baek et al. | |
| 2021/0036309 A1 | 2/2021 | Furuichi et al. | |

FOREIGN PATENT DOCUMENTS

| | | | |
|---|---|---|---|
| CN | 101335345 | A | 12/2008 |
| CN | 103872328 | A | 6/2014 |
| CN | 109565048 | A | 4/2019 |
| CN | 110662718 | A | 1/2020 |
| JP | 2006331939 | A | 12/2006 |
| JP | 2008159543 | A | 7/2008 |
| JP | 2009004316 | A | 1/2009 |
| JP | 2011100633 | A | 5/2011 |
| JP | 2012195082 | A | 10/2012 |
| JP | 2015536558 | A | 12/2015 |
| JP | 2016167439 | A | 9/2016 |
| JP | 6347776 | B2 | 6/2018 |
| KR | 20150079362 | A | 7/2015 |
| KR | 101567039 | B1 | 11/2015 |
| KR | 101595322 | B1 | 2/2016 |
| KR | 20170075124 | A | 7/2017 |
| KR | 101888180 | B1 | 8/2018 |
| KR | 101892612 | B1 | 8/2018 |
| KR | 101919516 | B1 | 11/2018 |
| KR | 20190078100 | A | 7/2019 |
| KR | 102044324 | B1 | 11/2019 |
| KR | 20190142147 | A | 12/2019 |
| WO | 2014189108 | A1 | 11/2014 |
| WO | 2018030199 | A1 | 2/2018 |
| WO | 2018181465 | A1 | 10/2018 |

OTHER PUBLICATIONS

International Search Report for Application No. PCT/KR2021/004775 mailed Jul. 21, 2021, 2 pages.
Extended European Search Report including Written Opinion for Application No. 21788135.8 dated Jul. 5, 2023, pp. 1-5.
Search Report dated Nov. 28, 2023 from the Office Action for Chinese Application No. 202180013044.6 issued Nov. 30, 2023, 2 pages.

*Primary Examiner* — Peter F Godenschwager
(74) *Attorney, Agent, or Firm* — Lerner David LLP

(57) ABSTRACT

The method of preparing a positive electrode capable of reducing the usage amount of a rinsing solution, and minimizing the surface degradation of a positive electrode active material is provided. A method of preparing a positive electrode active material includes: (A) preparing a lithium transition metal oxide; and (B) mixing the lithium transition metal oxide and a rinsing solution and performing rinsing and drying, wherein the rinsing solution includes one or more additive of LiOH, NaOH, or KOH, the additive is included in an amount of 3,000 ppm to 18,000 ppm relative to the lithium transition metal oxide in the rinsing solution, and the rinsing solution has a pH of 12 or more.

10 Claims, No Drawings

METHOD OF PREPARING POSITIVE ELECTRODE ACTIVE MATERIAL

CROSS-REFERENCE TO RELATED APPLICATION

This application is a national phase entry under 35 U.S.C. § 371 of International Application No. PCT/KR2021/004775, filed on Apr. 15, 2021, which claims priority to Korean Patent Application No. 10-2020-0046965, filed on Apr. 17, 2020, the disclosures of which are incorporated herein by reference in its entirety.

TECHNICAL FIELD

The present invention relates to a method of preparing a positive electrode active material. Specifically, the present invention relates to a method of preparing a positive electrode active material, which uses a rinsing solution including a trace amount of an additive and having a pH of 12 or more in a rinsing process.

BACKGROUND ART

Nickel-based positive electrode active materials are prepared by mixing a nickel-based positive electrode active material precursor and a lithium-containing raw material and firing the mixture and have a problem in that byproducts from a lithium-containing raw material unreacted in the preparation process, for example, LiOH, $Li_2CO_3$, and the like, remain on the surface of the positive electrode active material. Particularly, in the case of nickel-based positive electrode active materials having a high nickel content, there is a problem in that a large amount of residual lithium is present.

These byproducts may cause long-term performance degradation problems (e.g., long-term lifespan degradation, increase in resistance, etc.) and stability problems (e.g., gas generation, etc.) of a battery by reacting with an electrolyte. Also, they may cause a gelation phenomenon in the preparation process of an electrode slurry.

In order to prevent the problems, in a conventional process, a rinsing process of washing a positive electrode active material using deionized water or distilled water after a positive electrode active material precursor and a lithium-containing raw material are mixed and fired is performed to control residual lithium.

Meanwhile, to effectively control the residual lithium, there is an approach of using a large amount of deionized water or distilled water in the rinsing process, but the use of a large amount of deionized water or distilled water may cause problems in a process, and the surface of a positive electrode active material may be degraded, leading to degradation of battery performance.

Accordingly, there is a need to develop a method of preparing a positive electrode active material, which is capable of effectively controlling residual lithium and simultaneously suppressing degradation of a positive electrode active material.

DISCLOSURE

Technical Problem

The present invention is directed to providing a method of preparing a positive electrode active material, which is capable of minimizing the surface degradation of a positive electrode active material, which may occur during a rinsing process in the preparation of a positive electrode active material, and effectively controlling residual lithium, thereby minimizing degradation of battery performance.

Technical Solution

One aspect of the present invention provides a method of preparing a positive electrode active material, which includes steps of: (A) preparing a lithium transition metal oxide; and (B) mixing the lithium transition metal oxide and a rinsing solution and performing rinsing and drying, wherein the rinsing solution includes one or more additive of LiOH, NaOH, or KOH, the additive is included in an amount of 3,000 ppm to 18,000 ppm relative to the lithium transition metal oxide in the rinsing solution, and the rinsing solution has a pH of 12 or more.

Advantageous Effects

According to the present invention, the use of a rinsing solution, which includes a trace amount of an additive, has a pH similar to that of a positive electrode material, and has a rinsing function, in a rinsing process, can reduce the usage amount of the rinsing solution, minimize the surface degradation of a positive electrode active material, which occurs during a rinsing process, and effectively control residual lithium. Therefore, a battery using a positive electrode active material prepared by the method according to the present invention can exhibit excellent performance.

Modes of the Invention

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

It should be understood that the terms "comprises," "comprising," "includes," "including," "has," and/or "having," when used herein, specify the presence of stated features, integers, steps, components, and/or combinations thereof, but do not preclude the presence or addition of one or more other features, integers, steps, components, and/or combinations thereof.

Hereinafter, the present invention will be described in more detail.

Method of Preparing Positive Electrode Active Material

The inventors of the present invention have found that the use of a rinsing solution including a trace amount of an additive and having a pH of 12 or more in a rinsing process in the preparation of a positive electrode active material can reduce the usage amount of the rinsing solution, minimize the surface degradation of a positive electrode active material, which occurs during a rinsing process, and effectively remove residual lithium, and completed the present invention.

A method of preparing a positive electrode active material according to the present invention includes steps of: (A) preparing a lithium transition metal oxide; and (B) mixing the lithium transition metal oxide and a rinsing solution and performing rinsing and drying, wherein the rinsing solution includes one or more additive of LiOH, NaOH, or KOH, the additive is included in an amount of 3,000 ppm to 18,000 ppm relative to the lithium transition metal oxide in the rinsing solution, and the rinsing solution has a pH of 12 or more. In the present application, pH means pH at a temperature of 25° C. Also, in the present application, pH may be a value measured immediately after adding the additive to a solvent of a rinsing solution and mixing them for 3 minutes.

The method of preparing a positive electrode active material according to the present invention may further include a step of (C) mixing the dried lithium transition metal oxide with a coating element-containing raw material and performing thermal treatment to form a coating layer.

Hereinafter, each step of the method of preparing a positive electrode active material will be described in detail.

Step (A)

The method of preparing a positive electrode active material according to the present invention includes the step of preparing a lithium transition metal oxide.

The step of preparing a lithium transition metal oxide may include mixing a positive electrode active material precursor with a lithium-containing raw material and firing the mixture to prepare a lithium transition metal oxide.

The positive electrode active material precursor may be represented, for example, by the following Chemical Formula A or Chemical Formula B.

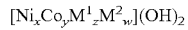  [Chemical Formula A]

$[Ni_xCo_yM^1_zM^2_w](OH)_2$  [Chemical Formula A]

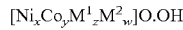  [Chemical Formula B]

$[Ni_xCo_yM^1_zM^2_w]O \cdot OH$  [Chemical Formula B]

In Chemical Formula A and Chemical Formula B, $M^1$ is one or more of Mn or Al, and $M^2$ is one or more of Zr, B, W, Mo, Cr, Nb, Mg, Hf, Ta, La, Ti, Sr, Ba, Ce, F, P, S, or Y.

x is an atomic fraction of nickel among metal elements in the precursor and may satisfy $0.6 \le x < 1$, $0.6 \le x \le 0.98$, or $0.7 \le x \le 0.95$.

y is an atomic fraction of cobalt among metal elements in the precursor and may satisfy $0 < y \le 0.4$, $0.01 \le y \le 0.4$, or $0.01 \le y \le 0.3$.

z is an atomic fraction of a $M^1$ element among metal elements in the precursor and may satisfy $0 < z \le 0.4$, $0.01 \le z \le 0.4$, or $0.01 \le z \le 0.3$.

w is an atomic fraction of a $M^2$ element among metal elements in the precursor and may satisfy $0 \le w \le 0.2$, $0 \le w \le 0.1$, $0 \le w \le 0.05$, or $0 \le w \le 0.02$.

The lithium-containing raw material may be, for example, at least one selected from the group consisting of lithium carbonate ($Li_2CO_3$), lithium hydroxide (LiOH), $LiNO_3$, $CH_3COOLi$, and $Li_2(COO)_2$ and is preferably lithium carbonate ($Li_2CO_3$), lithium hydroxide (LiOH), or a combination thereof.

In the preparation of a positive electrode active material, the positive electrode active material precursor and the lithium-containing raw material may be mixed in a molar ratio of 1:1 to 1:1.625 or 1:1 to 1:1.15. When the lithium-containing raw material is included below the range, the capacity of the positive electrode active material thus prepared may be degraded, and when the lithium-containing raw material is included above the range, unreacted Li may remain in the form of a byproduct, and capacity degradation and separation of positive electrode active material particles after firing (causing a combination phenomenon of a positive electrode active material) may occur.

The firing may be performed at 700° C. to 1000° C. When the firing temperature is below 700° C., the raw material may remain in particles due to an insufficient reaction such that the high-temperature stability of a battery is degraded, and bulk density and crystallinity may be decreased, result-ing in degraded structural stability. On the other hand, when the firing temperature is above 1000° C., particles may not uniformly grow, and it may be difficult to crush particles, leading to capacity degradation and the like. Meanwhile, the firing temperature is more preferably 700° C. to 980° C. in consideration of control of particle size of the positive electrode active material thus prepared, capacity, stability, and reduction of lithium-containing byproducts.

The firing may be performed for 5 hours to 35 hours. When the firing time is below 5 hours, it may be difficult to obtain a high-crystalline positive electrode active material due to an excessively short reaction time, and when the firing time is above 35 hours, particle size may be excessively increased, and production efficiency may be degraded.

According to the present invention, the lithium transition metal oxide may be represented by the following Chemical Formula 1.

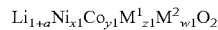  [Chemical Formula 1]

$Li_{1+a}Ni_{x1}Co_{y1}M^1_{z1}M^2_{w1}O_2$  [Chemical Formula 1]

In Chemical Formula 1, $0 \le a \le 0.3$, $0.6 \le x1 < 1.0$, $0 < y1 \le 0.4$, $0 < z1 \le 0.4$, $0 \le w1 \le 0.2$, and $x1+y1+z1+w1=1$ are satisfied, $M^1$ is one or more of Mn or Al, $M^2$ is one or more of Zr, B, W, Mo, Cr, Nb, Mg, Hf, Ta, La, Ti, Sr, Ba, Ce, F, P, S, or Y.

Step (B)

The method of preparing a positive electrode active material according to the present invention includes the step of mixing the lithium transition metal oxide and a rinsing solution and performing rinsing and drying.

The rinsing solution includes one or more additive of LiOH, NaOH, or KOH, and the additive is included in an amount of 3,000 ppm to 18,000 ppm relative to the lithium transition metal oxide in the rinsing solution, and the rinsing solution has a pH of 12 or more.

According to the present invention, the use of a rinsing solution, which includes a trace amount of an additive, has a pH similar to that of a positive electrode material, and has a rinsing function, in a rinsing process, may reduce the usage amount of the rinsing solution, minimize the surface degradation of a positive electrode active material, which occurs during a rinsing process, and effectively control residual lithium. Therefore, a battery using a positive electrode active material prepared by the method according to the present invention may exhibit excellent performance.

According to the present invention, even in the case of using a lithium transition metal oxide having a high nickel content as represented by Chemical Formula 1, when a rinsing process is performed using a rinsing solution including one or more additive of LiOH, NaOH, or KOH and having a pH of 12 or more, the surface degradation of a positive electrode active material, which occurs during the rinsing process, may be minimized, and residual lithium may be effectively controlled, and thus a positive electrode active material having excellent performance may be provided.

According to the present invention, the additive may be included in an amount of preferably 3,000 ppm to 15,000 ppm, and more preferably, 4,000 ppm to 10,000 ppm, relative to the lithium transition metal oxide in the rinsing solution. When the content of the additive is within the above-described range, particles can be prevented from being aggregated due to byproducts increased by residual lithium increased by the addition of the additive, and residual lithium can be effectively controlled.

According to the present invention, the rinsing solution may have a pH of 12 to 13. When the pH of the rinsing solution is within the above-described range, the usage amount of the rinsing solution can be reduced, and residual lithium can be easily removed. Also, surface degradation caused by a concentration difference between the rinsing solution and a positive electrode material can be minimized.

As described above, according to the present invention, the use of a rinsing solution, which includes a trace amount of an additive, has a pH similar to that of a positive electrode material, and has a rinsing function, in a rinsing process, may reduce the usage amount of the rinsing solution. Specifically, according to the present invention, the lithium transition metal oxide and the rinsing solution may be mixed in a weight ratio of 1:0.5 to 1:2.0, and preferably, 1:0.5 to 1:1.3 or 1:0.5 to 1:0.9. Accordingly, a problem in a process caused by using a large amount of deionized water or distilled water in a conventional rinsing process for effectively controlling residual lithium, a problem in that battery performance is degraded due to degradation of a positive electrode active material surface, and the like can be avoided.

According to the present invention, the additive may be included in an amount of 0.4 wt % to 2 wt %, and preferably, 0.4 wt % to 1 wt % in the rinsing solution. When the content of the additive is within the above-described range, particles can be prevented from being aggregated due to byproducts increased by residual lithium increased by the addition of the additive, and residual lithium can be effectively controlled.

According to the present invention, a solvent of the rinsing solution may be one or more or deionized water, distilled water, or ethanol. The solvent of the rinsing solution is preferably deionized water. Meanwhile, the rinsing solution may be a solution obtained immediately after adding the additive to the solvent and mixing them for 3 minutes.

The rinsing process may be performed for 5 minutes to 30 minutes. When the rinsing time is within the above-described range, residual lithium byproducts present on the surface of the lithium transition metal oxide can be easily removed. Accordingly, a gelation phenomenon cannot occur in preparation of a positive electrode slurry, and gas cannot be generated in application to a battery. Also, lithium present in the oxide is not discharged during the rinsing process, and thus battery performance cannot be degraded.

The drying process is intended to remove moisture from a moisture-containing positive electrode active material that has been subjected to the rinsing process and may be performed by removing moisture using a vacuum pump and then performing drying at 100° C. to 150° C. for 12 hours or more.

Step (C)

The method of preparing a positive electrode active material according to the present invention may further include the step of mixing the dried lithium transition metal oxide with a coating element-containing raw material and performing thermal treatment to form a coating layer. Accordingly, a positive electrode active material in which a coating layer is formed on the surface of the lithium transition metal oxide may be prepared.

A metal element contained in the coating element-containing raw material may be Zr, B, W, Mo, Cr, Nb, Mg, Hf, Ta, La, Ti, Sr, Ba, Ce, F, P, S, Y, or the like. The coating element-containing raw material may be an acetate, nitrate, sulfate, halide, sulfide, hydroxide, oxide, oxyhydroxide, or the like, which contains the metal element. For example, when the metal element is B, boric acid ($H_3BO_3$) or the like may be used.

The coating element-containing raw material may be included in an amount of 200 ppm to 2000 ppm relative to the dried lithium transition metal oxide. When the content of the coating element-containing raw material is within the above-described range, battery capacity can be improved, and the formed coating layer can suppress a direct reaction between an electrolyte and a lithium transition metal oxide, resulting in improvement of long-term performance of a battery.

The thermal treatment may be performed at 200° C. to 400° C. When the thermal treatment temperature is within the above-described range, a coating layer can be formed while maintaining the structural stability of a transition metal oxide. The thermal treatment may be performed for 1 hour to 10 hours. When the thermal treatment time is within the above-described range, an appropriate coating layer can be formed, and production efficiency can be improved.

Positive Electrode

In addition, the present invention provides a positive electrode for a lithium secondary battery, which includes a positive electrode active material prepared by the above-described method.

Specifically, the positive electrode includes a positive electrode current collector and a positive electrode active material layer formed on at least one surface of the positive electrode current collector and including the above-described positive electrode active material.

The positive electrode current collector is not particularly limited as long as it does not cause a chemical change in the battery and has conductivity. For example, stainless steel, aluminum, nickel, titanium, calcined carbon, aluminum or stainless steel whose surface has been treated with carbon, nickel, titanium, silver, or the like, or the like may be used as the positive electrode current collector. In addition, the positive electrode current collector may typically have a thickness of 3 μm to 500 μm and have fine irregularities formed on the surface thereof to increase the adhesion of a positive electrode active material. Additionally, the positive electrode current collector may be used in any of various forms such as a film, a sheet, a foil, a net, a porous material, a foam, a non-woven fabric, and the like.

The positive electrode active material layer may include a conductive material and a binder in addition to the positive electrode active material.

In this case, the positive electrode active material may be included at 80 wt % to 99 wt %, and more specifically, 85 wt % to 98 wt %, with respect to the total weight of the positive electrode active material layer. Within the above-described range, excellent capacity characteristics can be exhibited.

The conductive material is used to impart conductivity to the electrode, and any conductive material that does not cause a chemical change in the battery and has electron conductivity may be used without particular limitation. Specific examples of the conductive material include: graphite such as natural graphite, artificial graphite, or the like; a carbon-based material such as carbon black, acetylene black, Ketjen black, channel black, furnace black, lamp black, thermal black, carbon fiber, or the like; a metal powder or metal fiber containing copper, nickel, aluminum, silver, or the like; a conductive whisker such as zinc oxide, potassium titanate, or the like; a conductive metal oxide such as titanium oxide or the like; and a conductive polymer such as a polyphenylene derivative or the like, which may be used alone or in combination of two or more thereof. The conductive material may be included at 1 wt % to 30 wt % with respect to the total weight of the positive electrode active material layer.

The binder serves to improve cohesion between positive electrode active material particles and adhesion between the positive electrode active material and the current collector. Specific examples of the binder include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluoro-rubber, and various copolymers thereof, which may be used alone or in combination of two or more thereof. The binder may be included at 1 wt % to 30 wt % with respect to the total weight of the positive electrode active material layer.

The positive electrode may be manufactured by a conventional method of manufacturing a positive electrode, except that the above-described positive electrode active material is used. Specifically, the positive electrode may be manufactured by applying a composition for forming a positive electrode active material layer, which is prepared by dissolving or dispersing the above-described positive electrode active material and, optionally, a binder and a conductive material in a solvent, onto a positive electrode current collector, followed by drying and roll pressing. In this case, the types and contents of the positive electrode active material, the binder, and the conductive material have been described above.

The solvent may be a solvent generally used in the art, and examples of the solvent include dimethyl sulfoxide (DMSO), isopropyl alcohol, N-methyl pyrrolidone (NMP), acetone, water, and the like, which may be used alone or in combination of two or more thereof. The solvent is used in an amount sufficient to dissolve or disperse the positive electrode active material, the conductive material, and the binder and to have a viscosity capable of achieving excellent thickness uniformity upon subsequent application for manufacturing the positive electrode in consideration of a thickness of an applied slurry and a manufacturing yield.

According to another method, the positive electrode may be manufactured by laminating, on a positive electrode current collector, a film obtained by casting the composition for forming a positive electrode active material layer on a separate support and removing it from the support.

Lithium Secondary Battery

In addition, the present invention provides an electrochemical device including the above-described positive electrode. The electrochemical device may specifically be a battery, a capacitor, or the like, and more specifically, a lithium secondary battery.

The lithium secondary battery specifically includes a positive electrode, a negative electrode disposed to face the positive electrode, a separator interposed between the positive electrode and the negative electrode, and an electrolyte. Since the positive electrode is the same as described above, the detailed description thereof will be omitted, and only the remaining components will be described in detail.

In addition, the lithium secondary battery may optionally further include: a battery container which accommodates an electrode assembly including the positive electrode, the negative electrode, and the separator; and a sealing member which seals the battery container.

In the lithium secondary battery, the negative electrode includes a negative electrode current collector and a negative electrode active material layer formed on the negative electrode current collector.

The negative electrode current collector is not particularly limited as long as it does not cause a chemical change in the battery and has high conductivity. For example, copper, stainless steel, aluminum, nickel, titanium, calcined carbon, copper or stainless steel whose surface has been treated with carbon, nickel, titanium, silver, or the like, an aluminum-cadmium alloy, or the like may be used as the negative electrode current collector. In addition, the negative electrode current collector may typically have a thickness of 3 µm to 500 µm and have fine irregularities formed on the surface thereof to increase the adhesion of a negative electrode active material like the positive electrode current collector. Additionally, the negative electrode current collector may be used in any of various forms such as a film, a sheet, a foil, a net, a porous material, a foam, a non-woven fabric, and the like.

The negative electrode active material layer includes a negative electrode active material and, optionally, a binder and a conductive material.

As the negative electrode active material, a compound that enables the reversible intercalation and deintercalation of lithium may be used. Specific examples of the negative electrode active material include: a carbonaceous material such as artificial graphite, natural graphite, graphitized carbon fiber, amorphous carbon, or the like; a metallic compound capable of alloying with lithium, such as Si, Al, Sn, Pb, Zn, Bi, In, Mg, Ga, Cd, a Si alloy, a Sn alloy, an Al alloy, or the like; a metal oxide capable of doping and dedoping lithium, such as $SiO_\beta$ ($0<\beta<2$), $SnO_2$, vanadium oxide, or lithium vanadium oxide; and a composite including the metallic compound and the carbonaceous material, such as a Si—C composite or a Sn—C composite, which may be used alone or in combination of two or more thereof. In addition, a lithium metal thin film may be used as the negative electrode active material. Additionally, as a carbon material, both low-crystallinity carbon and high-crystallinity carbon may be used. Representative examples of the low-crystallinity carbon include soft carbon and hard carbon, and representative examples of the high-crystallinity carbon include amorphous, platy, flaky, spherical or fibrous natural graphite or artificial graphite, Kish graphite, pyrolytic carbon, mesophase pitch-based carbon fiber, meso-carbon microbeads, mesophase pitches, and high-temperature calcined carbon such as petroleum or coal tar pitch-derived cokes, and the like.

The negative electrode active material may be included in an amount of 80 wt % to 99 wt % with respect to the total weight of the negative electrode active material layer.

The binder serves to assist bonding between the conductive material, the active material, and the current collector and is typically included in an amount of 0.1 wt % to 10 wt % with respect to the total weight of the negative electrode active material layer. Examples of the binder include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylenediene polymer (EPDM), a sulfonated EPDM, styrene butadiene rubber, nitrile butadiene rubber, fluorine rubber, and various copolymers thereof.

The conductive material is a component for improving the conductivity of the negative electrode active material and may be included in an amount of 10 wt % or less, and preferably, 5 wt % or less with respect to the total weight of the negative electrode active material layer. Such a conductive material is not particularly limited as long as it does not cause a chemical change in the battery and has conductivity.

For example, graphite such as natural graphite, artificial graphite, or the like; carbon black such as acetylene black, Ketjen black, channel black, furnace black, lamp black, thermal black, or the like; a conductive fiber such as a carbon fiber, a metal fiber, or the like; a metal powder containing carbon fluoride, aluminum, nickel, or the like; a conductive whisker such as zinc oxide, potassium titanate, or the like; a conductive metal oxide such as titanium oxide or the like; or a conductive material such as a polyphenylene derivative or the like may be used.

For example, the negative electrode active material layer may be formed by applying, onto a negative electrode current collector, a negative electrode mixture, which is prepared by dissolving or dispersing a negative electrode active material and, optionally, a binder and a conductive material in a solvent, and drying the same, or by laminating, on a negative electrode current collector, a film obtained by casting the negative electrode mixture on a separate support and removing it from the support.

Meanwhile, in the lithium secondary battery, the separator serves to separate the negative electrode and the positive electrode and provide a passage for lithium ion migration. As the separator, any separator that is typically used in a lithium secondary battery may be used without particular limitation, and in particular, a separator that exhibits low resistance to the migration of electrolyte ions and has an excellent electrolyte impregnation ability is preferred. Specifically, a porous polymer film, for example, a porous polymer film made of a polyolefin-based polymer such as an ethylene homopolymer, a propylene homopolymer, an ethylene/butene copolymer, an ethylene/hexene copolymer, an ethylene/methacrylate copolymer, or the like or a stacked structure having two or more layers thereof, may be used. In addition, a typical porous non-woven fabric, for example, a non-woven fabric made of high-melting-point glass fiber, polyethylene terephthalate fiber, or the like may be used. Also, to ensure heat resistance or mechanical strength, a coated separator which includes a ceramic component or polymer material and is optionally in a single-layer or multi-layer structure may be used.

In addition, as the electrolyte used in the present invention, an organic liquid electrolyte, an inorganic liquid electrolyte, a solid polymer electrolyte, a gel-type polymer electrolyte, an inorganic solid electrolyte, a molten-type inorganic electrolyte, or the like, which is usable in the manufacture of the lithium secondary battery, may be used, but the present invention is not limited thereto.

Specifically, the electrolyte may include an organic solvent and a lithium salt.

As the organic solvent, any solvent that may function as a medium through which ions involved in an electrochemical reaction of the battery can migrate may be used without particular limitation. Specifically, the organic solvent may be: an ester-based solvent such as methyl acetate, ethyl acetate, γ-butyrolactone, ε-caprolactone, or the like; an ether-based solvent such as dibutyl ether, tetrahydrofuran, or the like; a ketone-based solvent such as cyclohexanone or the like; an aromatic hydrocarbon-based solvent such as benzene, fluorobenzene, or the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC), or the like; an alcohol-based solvent such as ethyl alcohol, isopropyl alcohol, or the like; a nitrile such as R-CN (R is a C2-C20 hydrocarbon group with a linear, branched or cyclic structure and may include a double-bonded aromatic ring or an ether linkage) or the like; an amide such as dimethylformamide or the like; dioxolane such as 1,3-dioxolane or the like; or sulfolane. Among those listed above, the carbonate-based solvent is preferred, and a mixture of a cyclic carbonate-based compound with high ion conductivity and high permittivity (e.g., EC, PC, etc.) and a linear carbonate-based compound with low viscosity (e.g., EMC, DMC, DEC, etc.), which may increase the charging/discharging performance of the battery, is more preferred. In this case, when a mixture obtained by mixing the cyclic carbonate-based compound and the linear carbonate-based compound in a volume ratio of about 1:1 to about 1:9 is used, excellent electrolyte performance may be exhibited.

As the lithium salt, any compound that may provide lithium ions used in a lithium secondary battery may be used without particular limitation. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used. The lithium salt is preferably used at a concentration of 0.1 M to 2.0 M. When the concentration of the lithium salt is within the above-described range, the electrolyte has appropriate levels of conductivity and viscosity, and thus excellent electrolyte performance can be exhibited, and lithium ions can effectively migrate.

In addition to the above-described electrolyte components, the electrolyte may further include at least one additive selected from a haloalkylene carbonate-based compound such as difluoroethylene carbonate and the like, pyridine, triethylphosphite, triethanolamine, cyclic ether, ethylenediamine, n-glyme, hexaphosphoric triamide, a nitrobenzene derivative, sulfur, a quinone imine dye, an N-substituted oxazolidinone, an N,N-substituted imidazolidine, an ethylene glycol dialkyl ether, an ammonium salt, pyrrole, 2-methoxyethanol, aluminum trichloride, and the like for the purpose of improving the lifetime characteristics of the battery, suppressing a reduction in battery capacity, improving the discharge capacity of the battery, or the like. In this case, the additive may be included in an amount of 0.1 wt % to 5 wt % with respect to the total weight of the electrolyte.

Since the lithium secondary battery including the positive electrode active material according to the present invention stably exhibits excellent discharge capacity, output characteristics, and lifetime characteristics as described above, it is useful in the field of portable devices such as mobile phones, notebook computers, digital cameras, and the like and electric vehicles such as hybrid electric vehicles (HEVs) and the like.

Accordingly, the present invention also provides a battery module including the lithium secondary battery as a unit cell and a battery pack including the battery module.

The battery module or battery pack may be used as a power source for one or more medium-to-large-sized devices selected from a power tool; electric vehicles (EVs), hybrid electric vehicles, and plug-in hybrid electric vehicles (PHEVs); and a system for storing electric power.

The type of lithium secondary battery according to the present invention may be, but is not particularly limited to, a cylindrical type using a can, a prismatic type, a pouch type, a coin type, or the like The lithium secondary battery according to the present invention may be used not only in a battery cell used as a power source of a small device but also as a unit battery in medium-to-large-sized battery modules including a plurality of battery cells.

Hereinafter, the present invention will be described in detail with reference to embodiments so that those skilled in the art can easily carry out the present invention. However, the present invention may be embodied in several different forms, and therefore, is not limited to embodiments described herein.

EXAMPLES AND COMPARATIVE EXAMPLES

The transition metal-containing solution, ammonium ion-containing solution, and basic aqueous solution used in the following examples and comparative examples are as follows.

Example 1

$NiSO_4$, $CoSO_4$, and $MnSO_4$ were mixed in water in amounts so that a molar ratio of nickel:cobalt:manganese became 88:5:7 to prepare a 2.4 M transition metal-containing solution. A vessel containing the transition metal-containing solution and, additionally, vessels containing a 25 wt % NaOH aqueous solution and a 9 wt % $NH_4OH$ aqueous solution were connected to a continuous filtration tank reactor (CFTR) equipped with a 350 L filtration device (filter) and set at 50° C. Then, 86 L of deionized water was added into the reactor, and the reactor was purged with nitrogen gas at a rate of 20 L/min to remove oxygen dissolved in water and to create a non-oxidizing atmosphere inside the reactor. Then, 100.8 g of a 5 wt % NaOH aqueous solution and 3406 g of a 9 wt % $NH_4OH$ aqueous solution were input into the reactor, and stirring was performed at 700 rpm to prepare a reaction mother liquor having a pH of 11.7 to 11.9.

Afterward, the transition metal-containing solution, the NaOH aqueous solution, and the $NH_4OH$ aqueous solution were input into the reactor to induce the formation and aggregation of nickel-cobalt-manganese hydroxide particles, thereby forming a precursor core. In this case, the transition metal-containing solution was added at 57.4 mol/hr, the $NH_4OH$ aqueous solution was added at 17 mol/hr, and the NaOH aqueous solution was added at a rate capable of maintaining the pH of a reaction solution at 10.5 to 11.2. Subsequently, a reaction proceeded while adjusting the input amount of the NaOH aqueous solution so that the pH of the reaction solution was maintained at 11.3 to 11.5 to induce the growth of nickel-cobalt-manganese hydroxide particles. The total reaction time including the precursor core formation time and the particle growth time was 40 hours. Then, the completely grown nickel-cobalt-manganese hydroxide particles were stabilized by an additional reaction for 8 hours. Meanwhile, the reaction was performed by continuously discharging a filtrate through a filtration device in the reactor when the reactor was full.

Next, the nickel-cobalt-manganese hydroxide particles formed by the above-described process were separated, rinsed, and dried at 60 to 120° C. for 12 to 30 hours to prepare a precursor in which $Ni_{0.88}Co_{0.05}Mn_{0.07}(OH)_2$ and $Ni_{0.88}Co_{0.05}Mn_{0.07}OH$ were mixed.

Subsequently, the precursor and LiOH were mixed in a molar ratio of 1:1.08 and then fired under an oxygen atmosphere at 780° C. for 10 hours to prepare a lithium transition metal oxide represented by an empirical formula $Li[Ni_{0.88}Co_{0.05}Mn_{0.07}]O_2$.

LiOH was added to deionized water so that LiOH was included in an amount of 0.44 wt % relative to a rinsing solution to prepare a rinsing solution having a pH of 12.21 at 25° C. The pH is a value measured immediately after adding LiOH to deionized water and mixing them for 3 minutes.

The lithium transition metal oxide and the rinsing solution (rinsing solution obtained immediately after adding LiOH to deionized water and mixing them for 3 minutes) were mixed in a weight ratio of 1:0.9, rinsed for 5 minutes, then filtered using a vacuum pump for 2 minutes, and dried in a vacuum oven set at 130° C. for 12 hours or more. The LiOH was included in an amount of 4,000 ppm relative to the lithium transition metal oxide.

The dried lithium transition metal oxide was mixed with $H_3BO_3$ powder so that the powder was included in an amount of 1000 ppm relative to the dried lithium transition metal oxide, and the resulting mixture was thermally treated at 300° C. for 5 hours to prepare a positive electrode active material in which a coating layer was formed on the surface of the lithium transition metal oxide.

Example 2

A positive electrode active material was prepared in the same manner as in Example 1, except that a rinsing solution having a pH of 12.05 at 25° C. was prepared by adding LiOH to deionized water so that LiOH was included in an amount of 1.10 wt % relative to the rinsing solution. In Example 2, LiOH was included in an amount of 10,000 ppm relative to a lithium transition metal oxide.

Comparative Example 1

A positive electrode active material was prepared in the same manner as in Example 1, except that deionized water having a pH of 5.91 at 25° C. was used as a rinsing solution.

Comparative Example 2

A positive electrode active material was prepared in the same manner as in Example 1, except that a rinsing solution having a pH of 11.85 at 25° C. was prepared by adding LiOH to deionized water so that LiOH was included in an amount of 2.17 wt % relative to the rinsing solution. In Comparative Example 2, LiOH was included in an amount of 20,000 ppm relative to a lithium transition metal oxide.

Comparative Example 3

A positive electrode active material was prepared in the same manner as in Example 1, except that deionized water having a pH of 5.91 at 25° C. was used as a rinsing solution, and a lithium transition metal oxide and a rinsing solution were mixed in a weight ratio of 1:1.8 and rinsed.

Comparative Example 4

A positive electrode active material was prepared in the same manner as in Example 1, except that a rinsing solution having a pH of 12.18 at 25° C. was prepared by adding LiOH to deionized water so that LiOH was included in an amount of 0.28 wt % relative to the rinsing solution. In Comparative Example 4, LiOH was included in an amount of 2,500 ppm relative to a lithium transition metal oxide.

Experimental Examples

Experimental Example 1: Evaluation of Half-Cell Characteristics

Each of the positive electrode active materials prepared in Examples 1 and 2 and Comparative Examples 1 to 4 was used to manufacture a lithium secondary battery, and the charge/discharge capacity, high-temperature capacity retention rate, and resistance increase rate of the lithium secondary battery were evaluated.

Specifically, each of the positive electrode active materials prepared in Examples 1 and 2 and Comparative Examples 1 to 4, carbon black as a conductive material, and PVdF as a binder were mixed in a weight ratio of 97.5:1.0:1.5 in an NMP solvent to prepare a positive electrode slurry. The positive electrode slurry was applied onto one surface of an aluminum current collector, dried at 130° C., and roll-pressed to manufacture a positive electrode. Meanwhile, a Li metal disk was used as a negative electrode active material. A separator was interposed between the manufactured positive electrode and the negative electrode to manufacture an electrode assembly, the electrode assembly was placed in a battery case, and an electrolyte was injected into the case, thereby manufacturing a lithium secondary battery. In this case, as the electrolyte, an electrolyte obtained by dissolving 1 M LiPF$_6$ in an organic EC/EMC/DEC (3/3/4, vol %) solvent was used to manufacture a lithium secondary battery.

The manufactured lithium secondary battery was charged at 25° C. at a constant current of 0.1C up to 4.3 V and then discharged at a constant current of 0.1C up to 3.0 V. Charge capacity and discharge capacity values are shown in Table 1.

In addition, the charging and discharging cycle was repeated 30 times at 45° C. at a constant current of 0.33C in a range of 3.0 to 4.3 V, and the capacity of the lithium secondary battery was measured. In this case, a ratio of the 30$^{th}$ cycle capacity relative to the first cycle capacity was designated as a capacity retention rate, and the capacity retention rate is shown in the following Table 1. Also, the voltage drop for 60 seconds after the start of discharge in each cycle was measured and divided by applied current values to measure high-temperature resistance. In this case, a rate of increase of the 30$^{th}$ cycle resistance value relative to the first cycle resistance value is shown in Table 1.

TABLE 1

| | Charge capacity (mAh/g) | Discharge capacity (mAh/g) | Capacity retention rate (%, 30 cycles) | Resistance increase rate (%, 30 cycles) |
|---|---|---|---|---|
| Example 1 | 229.7 | 208.4 | 95.9 | 120.5 |
| Example 2 | 228.7 | 207.3 | 96.2 | 125.6 |
| Comparative Example 1 | 228.9 | 208.8 | 96.0 | 128.5 |
| Comparative Example 2 | 228.5 | 206.6 | 96.0 | 134.5 |
| Comparative Example 3 | 229.6 | 206.4 | 96.6 | 120.0 |
| Comparative Example 4 | 228.7 | 207.1 | 90.6 | 128.2 |

Referring to Table 1, in the case of the secondary batteries to which the positive electrode active materials prepared in Examples 1 and 2 were applied, it can be confirmed that a resistance increase rate was low, and long-term degradation of performance could be minimized, as compared to the secondary battery to which the positive electrode active material of Comparative Example 1, which was prepared using deionized water alone as a rinsing solution in a rinsing process, was applied. In addition, in the case of the secondary battery to which the positive electrode active material prepared in Example 1 was applied, it can be confirmed that the initial capacity of the battery was improved, as compared to the secondary battery to which the positive electrode active material of Comparative Example 1 prepared using deionized water alone as a rinsing solution in a rinsing process was applied.

Meanwhile, in the case of the secondary battery to which the positive electrode active material of Comparative Example 2 prepared using a rinsing solution including LiOH in an amount of 20,000 ppm relative to the lithium transition metal oxide and having a pH of 11.85 was applied, a resistance increase rate was substantially increased, and initial capacity was degraded. In addition, in the case of Comparative Example 3 in which a positive electrode active material was prepared in the same manner as in Comparative Example 1 except that a proportion of a rinsing solution (deionized water) was increased, residual lithium byproducts on the surface were more effectively removed to improve long-term performance (e.g., capacity retention rate and resistance increase rate), but initial capacity was degraded, and process efficiency was degraded due to the use of a relatively large amount of rinsing solution, as compared to Comparative Example 1. Additionally, in the case of the secondary battery to which the positive electrode active material of Comparative Example 4 prepared using a rinsing solution including LiOH in an amount of 2,500 ppm relative to the lithium transition metal oxide despite having a pH of 12 or more was applied, the performance improvement effect was not achieved, and a resistance increase rate was high.

Therefore, according to the present invention, it can be seen that the use of a rinsing solution, which has a pH of 12 or more and includes one or more additive of LiOH, NaOH, or KOH, with the additive being included in an amount of 3,000 ppm to 18,000 ppm relative to the lithium transition metal oxide in the rinsing solution, in a rinsing process can reduce the usage amount of the rinsing solution, minimize the surface degradation of the positive electrode active material, which occurs during a rinsing process, and effectively control residual lithium, and thus when a positive electrode active material prepared by the method according to the present invention is applied to a secondary battery, the effect of improving battery performance can be achieved.

The invention claimed is:

1. A method of preparing a positive electrode active material, comprising:
   (A) preparing a lithium transition metal oxide; and
   (B) mixing the lithium transition metal oxide and a rinsing solution and performing rinsing and drying,
   wherein the rinsing solution includes one or more additive of LiOH, NaOH, or KOH,
   the additive is included in an amount of 3,000 ppm to 18,000 ppm relative to the lithium transition metal oxide in the rinsing solution, and
   the rinsing solution has a pH of 12 or more.

2. The method of claim 1, wherein the additive is included in an amount of 4,000 ppm to 10,000 ppm relative to the lithium transition metal oxide in the rinsing solution.

3. The method of claim 1, wherein the rinsing solution has a pH of 12 to 13.

4. The method of claim 1, wherein the lithium transition metal oxide is represented by the following Chemical Formula 1:

$$Li_{1+a}Ni_{x1}Co_{y1}M^1_{z1}M^2_{w1}O_2 \qquad \text{[Chemical Formula 1]}$$

wherein $0 \leq a \leq 0.3$, $0.6 \leq x1 < 1.0$, $0 < y1 \leq 0.4$, $0 < z1 \leq 0.4$, $0 \leq w1 \leq 0.2$, and $x1+y1+z1+w1=1$ are satisfied, $M^1$ is one or more of Mn or Al, and $M^2$ is one or more of Zr, B, W, Mo, Cr, Nb, Mg, Hf, Ta, La, Ti, Sr, Ba, Ce, F, P, S, or Y.

5. The method of claim 1, wherein the lithium transition metal oxide and the rinsing solution are mixed in a weight ratio of 1:0.5 to 1:2.0.

6. The method of claim 1, wherein the lithium transition metal oxide and the rinsing solution are mixed in a weight ratio of 1:0.5 to 1:1.3.

7. The method of claim 1, wherein the additive is included in an amount of 0.4 wt % to 2 wt % in the rinsing solution.

8. The method of claim 1, wherein the additive is included in an amount of 0.4 wt % to 1 wt % in the rinsing solution.

9. The method of claim 1, wherein a solvent of the rinsing solution is one or more of deionized water, distilled water, or ethanol.

10. The method of claim 1, further comprising (C) mixing the dried lithium transition metal oxide with a coating element-containing raw material and performing thermal treatment to form a coating layer.

* * * * *